United States Patent [19]

Raab et al.

[11] 4,274,525

[45] Jun. 23, 1981

[54] CLUTCH DISC

[75] Inventors: Harald Raab, Schweinfurt; Helmuth Weissenberger, Theilheim, both of Fed. Rep. of Germany

[73] Assignee: Fichtel & Sachs AG, Schweinfurt, Fed. Rep. of Germany

[21] Appl. No.: 121,305

[22] Filed: Feb. 13, 1980

[30] Foreign Application Priority Data

Feb. 21, 1979 [DE] Fed. Rep. of Germany ....... 2906675

[51] Int. Cl.$^3$ .............................................. F16D 3/14
[52] U.S. Cl. .................................. 192/106.2; 64/27 L
[58] Field of Search ............... 192/106.2, 106.1, 70.18; 64/27 F, 27 L

[56] References Cited

U.S. PATENT DOCUMENTS

| 2,291,405 | 7/1942 | Nutt | 192/106.2 |
| 2,314,948 | 3/1943 | Nutt | 192/106.2 |
| 2,636,363 | 4/1953 | Nutt | 192/106.2 |
| 2,826,902 | 3/1958 | DeCoursey | 192/106.2 |

Primary Examiner—George H. Krizmanich

[57] ABSTRACT

In a clutch disc, a flange disc is secured to and projects radially outwardly from an axially extending hub. A friction lining carrier projects radially outwardly from the hub and for a portion of its radial extent it is coextensive with the flange disc. Circumferentially extending springs are seated between stop faces on the flange disc and the friction lining carrier and limit the rotational movement of the carrier relative to the flange disc. Friction members are positioned between the friction lining carrier and the flange disc. One or more contact members are positioned between the friction lining carrier and the flange disc with the contact member being rotatable relative to the friction members. During relative rotation the contact member makes contact with the friction disc and the contacting surface of the contact member extends obliquely of the surface of the friction member so that the axial force applied against the friction member varies in dependence on the extent of relative rotation therebetween.

10 Claims, 3 Drawing Figures

CLUTCH DISC

SUMMARY OF THE INVENTION

The present invention is directed to a clutch disc including an axially extending hub having a flange disc projecting radially outwardly from the hub. A friction lining carrier with a clutch friction lining also extends radially outwardly from the hub and the carrier is rotatable about the hub axis for a limited angular extent relative to the flange disc. A plurality of springs are positioned between stop faces on the flange disc and the friction lining carrier with the stop faces being spaced apart in the circumferential direction of the disc and carrier. A plurality of friction discs are held between the friction lining carrier and the flange disc.

A clutch of this type is known from German Offenlegungsschrift No. 27 42 524. The springs seated between the stop faces of the flange disc and of the friction lining carrier face toward one another and are spaced apart in the circumferential direction for absorbing rotary oscillations and compensating torque variations as they develop, in particular when the clutch is engaged. The rotary oscillations are dampened by the friction discs which are axially resiliently clamped between the friction lining carrier and the flange disc.

The friction discs of the known clutch disc have an annular shape. A first friction disc is clamped by a spring ring between the disc on the hub and a parallel disc on the friction lining carrier. A second annular friction disc is clamped by spring clips between the disc of the friction lining carrier and a pressing ring. Engaging dogs or jaws which project axially from the pressing ring, engage in recesses in the flange disc. The recesses in the flange disc are wider in the circumferential direction than the engaging jaws, accordingly, the second friction disc becomes effective for damping only after the resulting play in the circumferential direction has been compensated. The play of the engaging jaws in the recesses of the flange disc is chosen equal to the play which certain of the springs have between the stop faces on the flange discs and on the friction lining carrier. Therefore, the second friction disc becomes effective for damping only when the springs which are held with a certain amount of play, are tensioned.

A constant axial spring force is applied to the friction discs of the known clutch disc independently of the position of rotation of the friction lining carrier relative to the flange disc. The second friction disc becomes effective suddenly when the play between the engaging jaws and the recesses of the flange disc no longer exists. Moreover, due to the special design of the fastening of the second friction disc, the damping action in the known clutch disc can be increased by no more than two stages.

Therefore, it is the primary object of the present invention to provide a clutch disc with a multiple stage friction disc damping action in a structurally simple manner with the individual friction stages blending smoothly one into the other.

In accordance with the present invention, the multiple-stage damping action is effected by providing at least one contact member between the friction lining carrier and the flange disc with the contact member being non-rotatably connected to one of the friction lining carrier or the flange disc. The contact member is provided with a surface which extends obliquely in the circumferential direction relative to the surface of at least one of the friction discs. Due to the oblique arrangement of the surface of the contact member relative to the friction disc the axial spring force acting on the friction disc varies in accordance with the position as the friction lining carrier rotates relative to the disc flange.

The number of friction stages is limited merely by the number of contact members which can be accommodated on the clutch disc. The surfaces of the contact members which extend obliquely of the axial direction of the hub ensure that the axial spring forces acting on the friction discs or members increase or decrease within a predetermined path of rotary travel so that the individual friction stages can blend smoothly one into the other.

The contact member may be a cam which extends obliquely to the axial direction of the hub in the circumferential direction around the hub. In such an arrangement, a spring which presses axially against the friction disc can be tensioned by means of the cam or the friction disc can be unloaded against the forces of the spring.

In another embodiment, the contact member consists of a leaf spring extending in the circumferential direction of the hub with the spring being bent in the axial direction of the hub. When the friction lining carrier is rotated relative to the flange disc, the friction disc slides relative to the bent surface of the leaf spring which extends obliquely of the surface of the friction disc. As a result, the leaf spring is deflected and provides an axially resilient bearing against the friction disc or member.

These last two embodiments have the advantage that they are inexpensive and require little space.

The friction disc and the leaf spring can be positioned on opposing surfaces of the friction lining carrier and the hub disc, spaced apart in the axial direction of the hub. The leaf spring is bent in the circumferential direction so that it extends toward the friction disc in only a certain region and contacts the friction disc in at least this region. To provide relatively high spring forces, preferably the leaf spring is fastened at both of its ends. Excessive wear of the friction disc due to the fastening members is not expected when the leaf spring has a fastening arm at each of its circumferentially spaced ends which extend approximately radially inwardly toward the hub. In such an arrangement the fastening members or arms are located outside of the path of travel of the friction discs. For the best possible utilization of the space available on the clutch disc, it is preferable that the leaf springs and the friction disc are arranged radially outside of the springs which act in the circumferential direction between the friction lining carrier and the flange disc. This is advantageously achieved with the leaf spring overlapping one of the springs acting in the circumferential direction. If fastening arms are provided on the leaf spring, they are fixed on the opposite ends of the springs acting in the circumferential direction.

The invention is not limited to any special construction of the friction lining carrier. The carrier may be formed of two flange discs each arranged on opposite sides of the flange disc on the hub and the carrier flange discs are connected to one another by bolts. One of the carrier flange discs supports the clutch friction lining. In such a friction lining carrier, the leaf spring or its cooperating friction disc is preferably arranged on the other carrier flange disc.

In a preferred embodiment, a plurality of friction members with separate contact members are provided which change the axial spring force acting on the respectively assigned friction disc at different relative angular positions of the friction lining carrier and the flange disc. In this manner, with relatively simple means a damping characteristic which may possibly be non-linear can be obtained in dependence on the relative position of rotation of the friction lining carrier and the flange disc.

In addition to the friction members in which the contacting forces acting on the friction members can be changed by means of the contact members, additional friction discs can be provided on which, in a known manner, an axial spring force can act which is independent of the angular position of the friction lining carrier relative to the flange disc.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 2:
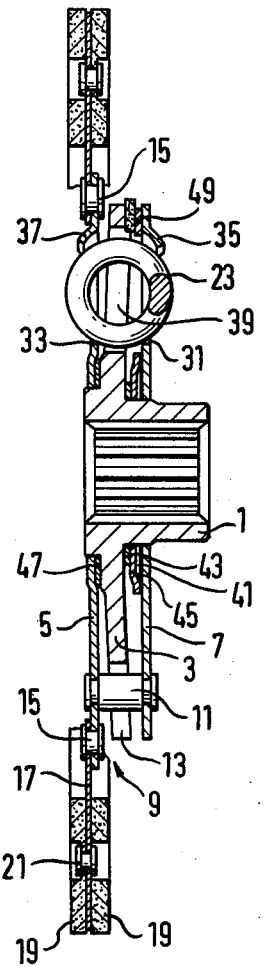
FIG. 2 is a sectional view taken along the line II—II in FIG. 1.

In the drawing a clutch disc forming part of a motor vehicle clutch, not shown is illustrated. The clutch disc includes an axially extending hub 1 arranged to be mounted on a shaft so that it does not rotate relative to the shaft but is axially movable along the shaft. A flange disc 3 projects radially outwardly from the hub 1. A friction lining carrier 9 extends radially outwardly from said hub and includes a pair of discs 5 and 7 each located on and in spaced relationship with an opposite side of the flange disc 3 radially outwardly from the hub in the region of the flange disc 3, the carrier discs 5, 7 are connected to one another by rivet bolts 11 which extend through recesses or cutouts 13 in the flange disc 3. Rivets 15 connect an annular disc 17 to the radially outer part of the carrier disc 5. On the opposite sides of the annular disc 17 in the axial direction of the hub, clutch friction bearings 19 are secured by means of rivets 21. While the clutch friction linings 19 are formed of segments, they could also be constructed as a ring. Two pairs of helical springs 23, 25 and 27, 29 are arranged diametrically opposite one another across the hub 1. Depending on the direction of rotation of friction lining carrier 9 relative to the hub flange disc 3, one of the helical springs 23, 25, 27, 29 of each pair is elastically compressed. The helical springs 23-29 are seated in window cutouts 31, 33 of the discs 7 and 5, respectively. The cutouts are in alignment in the axial direction of the hub. The helical springs are held in the cutouts 31, 33 by bent lugs 35, 37 located along the radially outer edges of the cutouts, note FIG. 2. In addition, cutouts 39 are provided in the flange disc 3 for each of the helical springs 23-29. When the friction lining carrier 9 is rotated relative to the flange disc 3, the opposite edges of the cutouts 31 or 39 spaced apart in the circumferential direction form opposing stop faces which compress the helical springs 23-29. The maximum angle of rotation through which the friction lining carrier can be rotated relative to the flange disc is limited either by the maximum spring deflection in the circumferential direction of the helical springs or by the play of the rivet bolts 11 in the recesses 13 in the flange disc 3. The helical springs 27, 29 have a softer spring characteristic than the helical springs 23, 25 and they are clamped with initial tension between the circumferentially opposed edges of the cutouts 31 and 39. The helical springs 23, 25 are held in the cutouts of the discs 5, 7 while the cutout 39 in the flange disc 3 is longer in the circumferential direction than the cutout 31 so that the helical springs 23, 25 are tensioned only after the play resulting between the differences in the circumferential dimensions of the cutouts has been compensated.

Between the radially inner edge of the disc 7 and the flange disc 3, an annular friction disc 41 is axially resiliently clamped by a spring ring 43 which bears against the flange disc 3. A pressure compensating ring 45 is positioned between the spring ring 43 and the friction disc 41. Moreover, spring ring 43 applies a load to an annular friction disc 47 located between the radially inner edge of the disc 5 and the flange disc 3.

Figure 3:
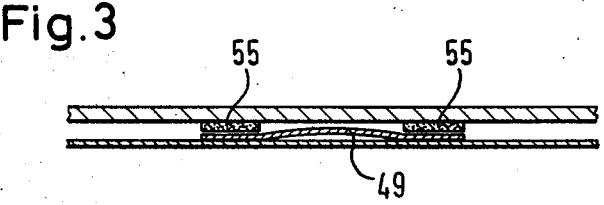
FIG. 3 is a detail sectional view taken along the line III—III in FIG. 1.

Positioned radially outwardly from the springs 23, 25 circumferentially extending leaf springs 49 are mounted on the disc 7. The opposite ends of the leaf springs 49, spaced apart in the circumferential direction, have approximately radially inwardly extending arms 51 with these arms being located outwardly of the ends of the helical springs 23, 25. Note in FIG. 1 that the arms 51 extend inwardly at the opposite ends of the two helical springs 23, 25. The arms 51 are fastened on the disc 7 by means of rivets 53. In the circumferential direction extending between the arms 51 the leaf springs 49 are bent toward the flange disc 3, note FIG. 3. When the friction lining carrier 9a rotates relative to the flange disc 3, the bent portion of each leaf spring 49 commences to contact friction disc segments 55 located on the flange disc. The segments 55 are positioned on the flange disc 3 spaced apart in the circumferential direction so they are out of contact with the leaf spring 49 when the flange disc 3 is in the rest position. The leaf springs 49 apply a spring force acting in the axial direction of the hub against the friction disc segments 55 during rotation of the friction lining carrier relative to the flange disc 3 so that the torsional oscillation of the carrier relative to the flange disc is dampened. The active engagement of the leaf springs 49 with the friction disc segments 55 is gradual in accordance with the gentle oblique arrangement of the curved surface of the leaf springs relative to the friction disc segments. While the friction discs 41, 47 are in constant frictional engagement, the friction disc segments 55 are in frictional contact with the springs 49 only over a limited angular range during the rotation of the carrier 9 relative to the flange disc 3.

Figure 1:
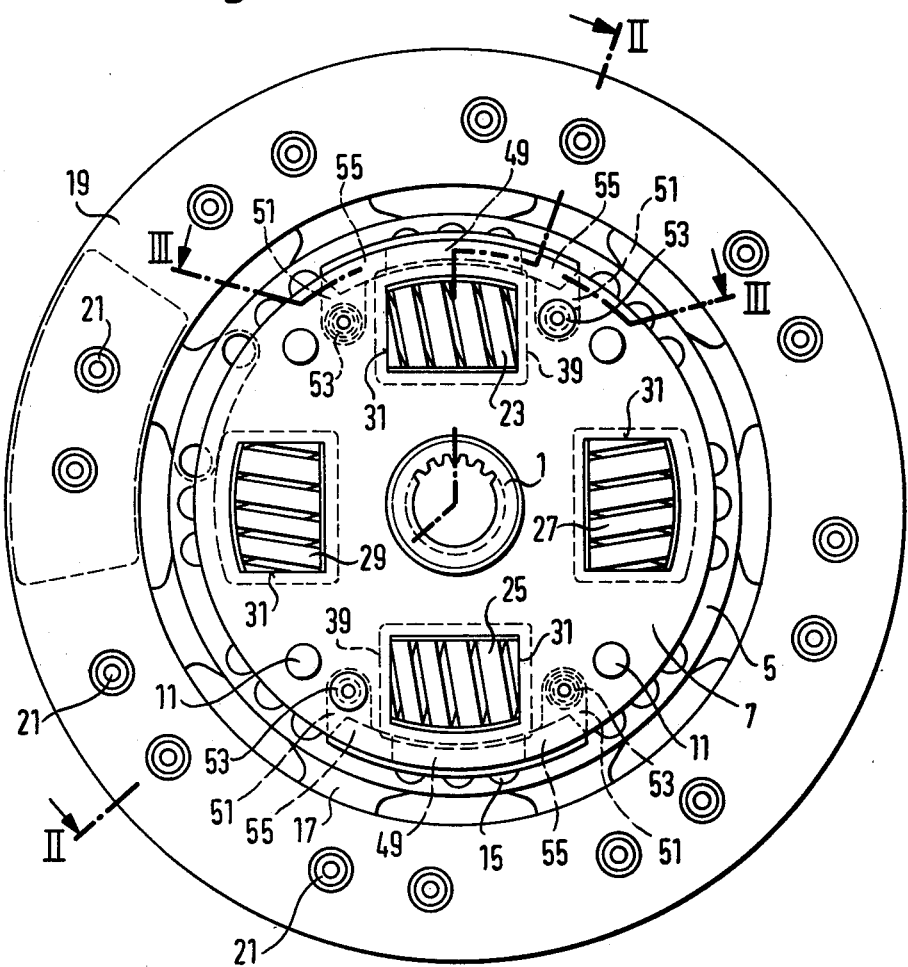
FIG. 1 is a view of a clutch disc embodying the present invention.

In FIG. 1, leaf springs 49 and friction discs 55 are only located adjacent to the helical springs 23, 25. It would be possible, however, to provide friction disc segments and leaf springs adjacent to the helical springs 27, 29. Furthermore, the distance in the circumferential direction from the friction disc segments to the bent portion of the leaf springs can be varied from helical spring to helical spring, so that an additional stepwise frictional engagement is obtained for affording a multiple-stage friction disc damping device.

Instead of using the leaf springs 49, one of the discs of the friction lining carrier or the flange disc can support a wedge surface onto which the friction disc segments slide when the friction lining carrier 9 is rotated relative to the flange disc 3. In other words, the wedge surface presents an obliquely disposed contact surface for the friction disc 6 so that an increased frictional contact is provided during rotation of the friction lining carrier relative to the flange disc.

While specific embodiments of the invention have been shown and described in detail to illustrate the application of the inventive principles, it will be understood that the invention may be embodied otherwise without departing from such principles.

What is claimed is:

1. A clutch disc comprising an axially extending hub, a flange disc projecting radially outwardly from said hub, a friction lining carrier having a clutch friction lining thereon, said carrier projecting radially outwardly from said hub, said carrier being rotatable relative to said flange disc about said hub axis for a limited axial extent, at least portions of said friction lining carrier and said flange disc being radially co-extensive and said friction lining carrier and flange disc each forming stop faces spaced apart in the circumferential direction, a plurality of springs seated between said stop faces on said friction lining carrier and flange disc, and a plurality of friction discs axially resiliently clamped between said friction lining carrier and flange disc, wherein the improvement comprises that at least one contact member is located between said friction lining carrier and said flange disc and is secured to one of said friction lining carrier and said flange disc, at least one friction member secured to the other one of said friction lining carrier and said flange disc, said at least one friction member located in the circumferential path of movement of said contact member when said friction lining carrier rotates relative to said flange disc, said at least one friction member having a surface facing toward said contact member, said contact member having a surface extending in the circumferential direction relative to said hub axis and said surface extending obliquely relative to the facing surface of said at least one friction member so that as said friction lining carrier rotates relative to said flange disc said oblique surface moves in the circumferential direction into contact with the facing surface of said at least one friction member for varying the axial force applied against said at least one friction member in accordance with the extent of the relative rotational movement of said friction lining carrier relative to said flange disc.

2. A clutch disc, as set forth in claim 1, wherein said contact member is a cam.

3. A clutch disc, as set forth in claim 1, wherein said contact member is a leaf spring bent in the axial direction of said hub and extending in the circumferential direction of said hub so that said leaf spring is secured to one of said friction lining carrier and said flange disc and projects therefrom toward the other one of said friction lining carrier and said flange disc.

4. A clutch disc, as wet forth in claim 3, wherein said leaf spring is bent toward said friction member so that as said friction lining carrier is rotated relative to said flange disc the bent portion of said leaf spring commences contact with the facing surface of said friction member.

5. A clutch disc, as set forth in claim 4, wherein the opposite ends of said leaf spring spaced apart in the circumferential direction around said hub axis each has a fastening arm extending approximately radially inwardly toward said hub.

6. A clutch disc, as set forth in claim 4, wherein said leaf spring and said friction member are located radially outwardly from said springs seated between said stop faces on said friction lining carrier and said flange disc.

7. A clutch disc, as set forth in claim 6, wherein said leaf spring has a length in the circumferential direction between the radially inwardly extending ends thereof greater than the length of said springs seated between said stop faces so that said leaf spring overlaps said springs in the circumferential direction around said hub.

8. A clutch disc, as set forth in claim 4, wherein said friction lining carrier includes two discs each arranged on an opposite side of said flange disc and disposed in spaced relation to said flange disc in the axial direction of said hub, bolts interconnecting said discs of said friction lining carrier, said clutch friction lining being secured to one of said discs of said friction lining carrier and said leaf spring being secured to the other one of said discs of said friction lining carrier.

9. A clutch disc, as set forth in claim 1, wherein a plurality of said friction members being secured to the other one of said friction lining carrier and said flange disc and spaced apart in the circumferential direction thereof, a plurality of contact members secured to one of said friction lining carrier and said flange disc and spaced apart in the circumferential direction thereof so that each said contact member contacts at least a different one of said friction members as said friction lining carrier is rotated relative to said flange disc, and the spacing between said friction members and said contact members in the circumferential direction being different so that said contact members engage said friction members at different relative angular positions during the rotation of said friction lining carrier relative to said flange for affording a multiple-stage friction effect.

10. A clutch disc, as set forth in claim 1, wherein means are arranged relative to at least one of said friction discs for affording a spring force in the axial direction of said hub independent of the relative angular position of said friction lining carrier and said flange disc.

* * * * *